US012655901B2

(12) United States Patent     (10) Patent No.: US 12,655,901 B2

Li et al.     (45) Date of Patent: Jun. 16, 2026

(54) TRANSMISSION OF VEHICLE, POWERTRAIN, AND VEHICLE WITH IMPROVED OIL FLOW MECHANISM

(71) Applicant: BYD COMPANY LIMITED, Shenzhen (CN)

(72) Inventors: Jianwen Li, Shenzhen (CN); Yankai Zhang, Shenzhen (CN); Xuean Fei, Shenzhen (CN); Yun Wei, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/763,703

(22) Filed: Jul. 3, 2024

(65) Prior Publication Data

US 2024/0352999 A1     Oct. 24, 2024

Related U.S. Application Data

(63) Continuation of application No. PCT/CN2023/070612, filed on Jan. 5, 2023.

(30) Foreign Application Priority Data

Mar. 30, 2022 (CN) .......................... 202210326382.1

(51) Int. Cl.
*F16H 57/04* (2010.01)

(52) U.S. Cl.
CPC ..... *F16H 57/0421* (2013.01); *F16H 57/0409* (2013.01); *F16H 57/0423* (2013.01);
(Continued)

(58) Field of Classification Search
CPC ............. F16H 57/0409; F16H 57/0421; F16H 57/0423; F16H 57/0443; F16H 57/0445;
(Continued)

(56) References Cited

U.S. PATENT DOCUMENTS 7,694,597 B2 * 4/2010 Nishi ...................... F16H 57/04
184/11.2
8,261,883 B2 * 9/2012 Ariga .................. F16H 57/0423
474/1

(Continued)

FOREIGN PATENT DOCUMENTS

CN     109565224 A     4/2019
CN     109944918 A     6/2019
(Continued)

OTHER PUBLICATIONS

The World Intellectual Property Organization (WIPO) International Search Report for PCT/CN2023/070612 Mar. 19, 2023 5 Pages (including translation).

*Primary Examiner* — Minh Truong

(74) *Attorney, Agent, or Firm* — Wenye Tan

(57) ABSTRACT

A vehicle having a powertrain and a power battery is provided. The powertrain includes an engine, a power generator, a driving motor, and a transmission. The power generator is connected to the engine in a transmission manner. The transmission includes a housing and a one-way oil channel. An isolation board is arranged in the housing, a driving cavity is provided on a side of the isolation board, and a power generation cavity is provided on the other side of the isolation board. The one-way oil channel is located at a top of the driving cavity and the power generation cavity, and the one-way oil channel is configured to guide oil from the driving cavity to the power generation cavity in a unidirectional manner.

17 Claims, 6 Drawing Sheets

(52) U.S. Cl.
CPC ..... *F16H 57/0453* (2013.01); *F16H 57/0457* (2013.01); *F16H 57/0475* (2013.01)

(58) Field of Classification Search
CPC ............ F16H 57/0453; F16H 57/0457; F16H 57/0475

See application file for complete search history.

(56) References Cited

U.S. PATENT DOCUMENTS

| | | | | |
|---|---|---|---|---|
| 8,899,381 | B2 * | 12/2014 | Ebihara | F16H 57/0423 |
| | | | | 184/6.12 |
| 9,103,432 | B2 * | 8/2015 | Isomura | F16H 57/0427 |
| 9,772,027 | B2 * | 9/2017 | Preston | F16H 57/0409 |
| 10,337,603 | B2 * | 7/2019 | Nishimine | F16H 57/0482 |
| 10,458,533 | B2 * | 10/2019 | Ono | F16H 57/0476 |
| 11,149,838 | B2 * | 10/2021 | Hagino | F01M 9/06 |
| 11,549,581 | B2 * | 1/2023 | Matsui | F16H 57/0471 |
| 11,598,410 | B2 * | 3/2023 | Ishikawa | F16H 57/0457 |
| 11,796,049 | B2 * | 10/2023 | Jeong | B60K 17/043 |
| 12,259,037 | B2 * | 3/2025 | Watanabe | F16H 57/0457 |
| 2005/0230215 | A1 * | 10/2005 | Kimura | F16H 57/043 |
| | | | | 192/48.8 |
| 2006/0065487 | A1 * | 3/2006 | Tominaga | F16H 57/05 |
| | | | | 184/6.12 |
| 2008/0236952 | A1 * | 10/2008 | Shimizu | F16H 61/0009 |
| | | | | 184/6.22 |
| 2010/0242895 | A1 * | 9/2010 | Takiguchi | F01M 5/002 |
| | | | | 123/196 R |
| 2013/0145879 | A1 * | 6/2013 | Nakamura | F16H 57/0441 |
| | | | | 74/467 |
| 2013/0283972 | A1 * | 10/2013 | Yamamoto | B60K 6/22 |
| | | | | 903/902 |
| 2014/0155214 | A1 * | 6/2014 | Kimura | F16H 57/045 |
| | | | | 475/160 |
| 2014/0213405 | A1 * | 7/2014 | Ishikawa | F16H 57/027 |
| | | | | 475/160 |
| 2017/0108109 | A1 * | 4/2017 | Itoo | F16H 57/045 |
| 2019/0145509 | A1 | 5/2019 | Yu et al. | |
| 2019/0173358 | A1 | 6/2019 | Ishikawa et al. | |
| 2019/0178365 | A1 * | 6/2019 | Ishikawa | F16H 57/0493 |
| 2020/0263781 | A1 * | 8/2020 | Akiyama | F16H 57/0457 |
| 2021/0190200 | A1 * | 6/2021 | Itou | F16H 55/17 |
| 2022/0205530 | A1 * | 6/2022 | Ishikawa | H02K 9/19 |
| 2022/0282784 | A1 * | 9/2022 | Nakata | F16H 57/0495 |
| 2023/0067898 | A1 * | 3/2023 | Oki | F16H 57/0409 |
| 2024/0117874 | A1 * | 4/2024 | Yamamoto | F16H 57/0476 |
| 2025/0180107 | A1 * | 6/2025 | Usami | H02K 9/19 |
| 2025/0189032 | A1 * | 6/2025 | Toyoshima | F16H 57/0424 |

FOREIGN PATENT DOCUMENTS

| | | | | |
|---|---|---|---|---|
| CN | 212203048 | U | 12/2020 | |
| CN | 113494594 | A | 10/2021 | |
| CN | 113525066 | A | 10/2021 | |
| CN | 113547907 | A | 10/2021 | |
| DE | 102019102078 | B3 | 6/2020 | |
| JP | H1026216 | A | 1/1998 | |
| WO | 2021044809 | A1 | 3/2021 | |
| WO | WO-2022270060 | A1 * | 12/2022 | ............ F16H 57/04 |

* cited by examiner

TRANSMISSION OF VEHICLE, POWERTRAIN, AND VEHICLE WITH IMPROVED OIL FLOW MECHANISM

CROSS-REFERENCE TO RELATED APPLICATIONS

The present application is a continuation application of PCT application No. PCT/CN2023/070612, filed on Jan. 5, 2023, which claims priority to Chinese Patent Application No. 202210326382.1, filed on Mar. 30, 2022 and entitled "TRANSMISSION OF VEHICLE, POWERTRAIN, AND VEHICLE", content of all of which is incorporated herein by reference in its entirety.

FIELD

The present disclosure relates to the field of vehicle technologies, and in particular, to a transmission of a vehicle, a powertrain, and a vehicle.

BACKGROUND

In the related art, in some hybrid vehicles, the internal space of the transmission is one cavity as a whole. When such a vehicle travels on an inclined road surface such as an uphill road surface or a downhill road surface, the transmission of the vehicle is inclined. Because the engine input shaft and the power generator shaft in the transmission are higher than the differential, the engine input shaft and the power generator shaft cannot contact with oil or can contact only a small amount of oil when the transmission is inclined, leading to poor lubrication of the engine input shaft and the power generator shaft and low reliability of the transmission.

Although the internal space of the transmission is separated into multiple independent cavities in some other vehicles, auxiliary components need to be arranged between the multiple cavities to facilitate the flow of oil between the multiple cavities, leading to increased manufacturing costs of the transmission.

SUMMARY

The present disclosure is intended to resolve at least one of technical problems existing in the related art. In view of this, the present disclosure provides a transmission of a vehicle. The transmission of a vehicle has a simple and reliable structure.

The present disclosure further provides a powertrain.

The present disclosure further provides a vehicle.

An embodiment of a first aspect of the present disclosure provides a transmission of a vehicle, including: a housing, an isolation board being arranged in the housing, a driving cavity being provided on a side of the isolation board, and a power generation cavity being provided on the other side of the isolation board; and a one-way oil channel, the one-way oil channel being located at a top of the driving cavity and the power generation cavity, and the one-way oil channel being configured to guide oil from the driving cavity to the power generation cavity in a unidirectional manner. Therefore, the isolation board separates an internal space of the housing into the power generation cavity and the driving cavity that independently store oil, and causes the one-way oil channel to guide the oil in the driving cavity to the power generation cavity. In this way, when a vehicle is in an uphill road section or a downhill road section, and the transmission is inclined relative to a horizontal plane, sufficient oil is still stored in the power generation cavity and the driving cavity to lubricate internal components, thereby ensuring reliability of the transmission of a vehicle.

An embodiment of a second aspect of the present disclosure provides a powertrain, including: an engine; a power generator, the power generator being connected to the engine in a transmission manner; a driving motor; and the transmission of a vehicle according to the embodiment of the first aspect of the present disclosure, the driving transmission assembly being arranged in the driving cavity, the power generation driving assembly being arranged in the power generation cavity, an input end of the driving transmission assembly being connected to the driving motor, an output end of the driving transmission assembly being configured to connect to wheels, an input end of the power generation driving assembly being configured to connect to the engine, and an output end of the power generation driving assembly being configured to connect to a power battery.

An embodiment of a third aspect of the present disclosure provides a vehicle, including the powertrain according to the embodiment of the second aspect of the present disclosure, and a power battery, the power battery being connected to the powertrain. The power battery is connected to the power generator and the driving motor.

Additional aspects and advantages of the present disclosure will become apparent from the following description or may be learned from practices of the present disclosure.

BRIEF DESCRIPTION OF THE DRAWINGS

The foregoing and/or additional aspects and advantages of the present disclosure will become apparent and comprehensible from the following descriptions of certain embodiments with reference to the accompanying drawings.

Figure 1:
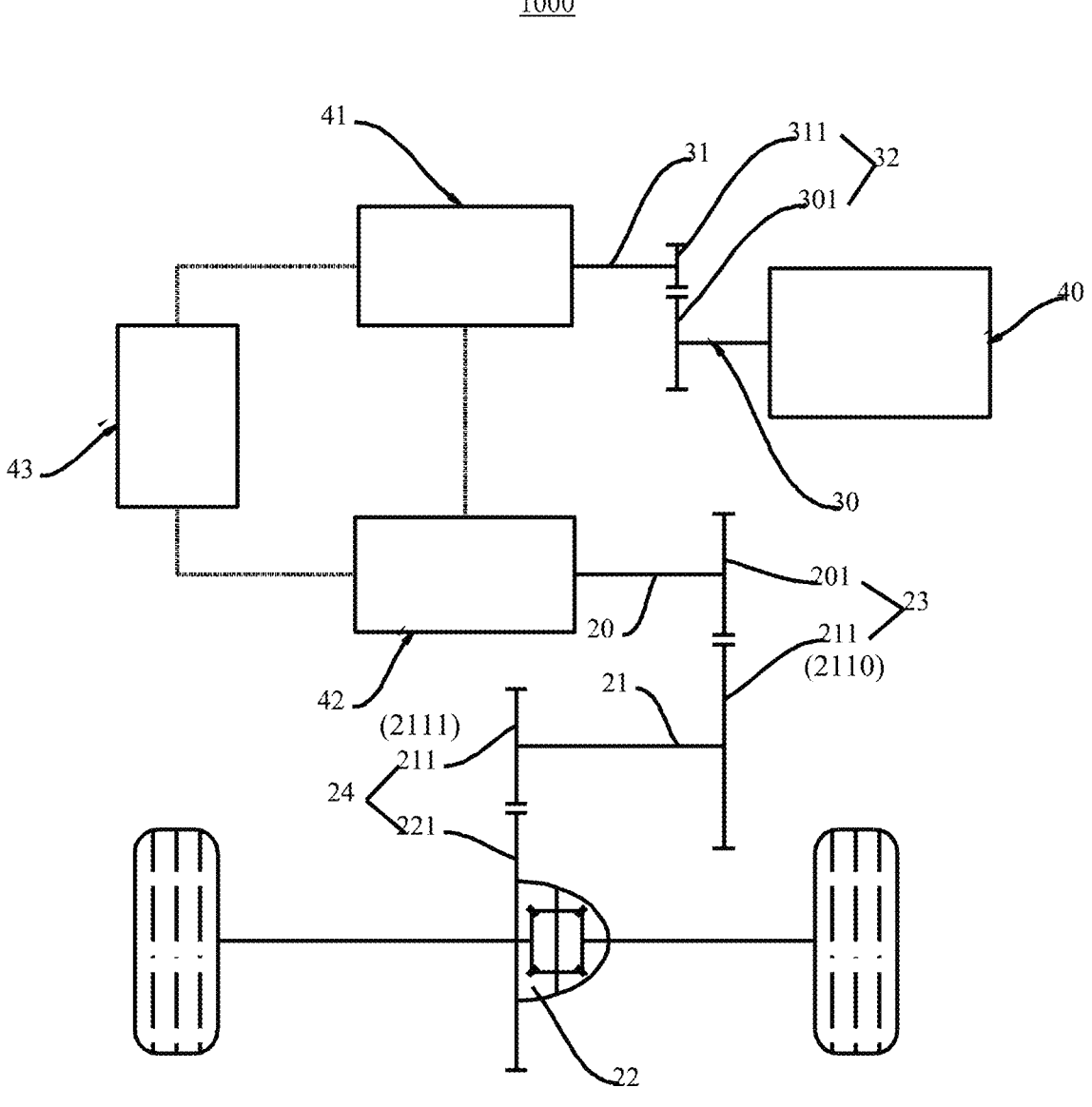
FIG. 1 is a schematic diagram of a powertrain according to an embodiment of the present disclosure.

Reference numerals: 1000: powertrain; 100: transmission; 10: housing; 11: isolation board; 12: one-way oil channel; 121: oil inlet port; 122: oil outlet port; 13: driving cavity; 14: power generation cavity; 141: oil drain mechanism; 1411: oil drain port; 1412: oil drain valve; 15: first oil baffle; 151: first opening; 16: second oil baffle; 161: second opening; 17: first oil level; 18: second oil level; 20: driving motor shaft; 201: driving motor gear; 21: intermediate shaft; 211: intermediate gear; 2110: large intermediate gear; 2111: small intermediate gear; 22: differential; 221: differential gear; 23: first transmission gear pair; 24: second transmission gear pair; 30: engine input shaft; 301: engine input gear; 31: power generator shaft; 311: power generator input gear; 32: third transmission gear pair; 40: engine; 41: power generator; 42: driving motor; 43: power battery; and 2000: vehicle.

DETAILED DESCRIPTION

Embodiments described in detail below with reference to accompanying drawings are for the purposes of illustration.

A transmission 100 of a vehicle according to the embodiments of the present disclosure is described below with reference to FIG. 1 to FIG. 6. The transmission 100 of a vehicle may be used in a powertrain 1000. The powertrain 1000 may be used in a vehicle.

Figure 2:
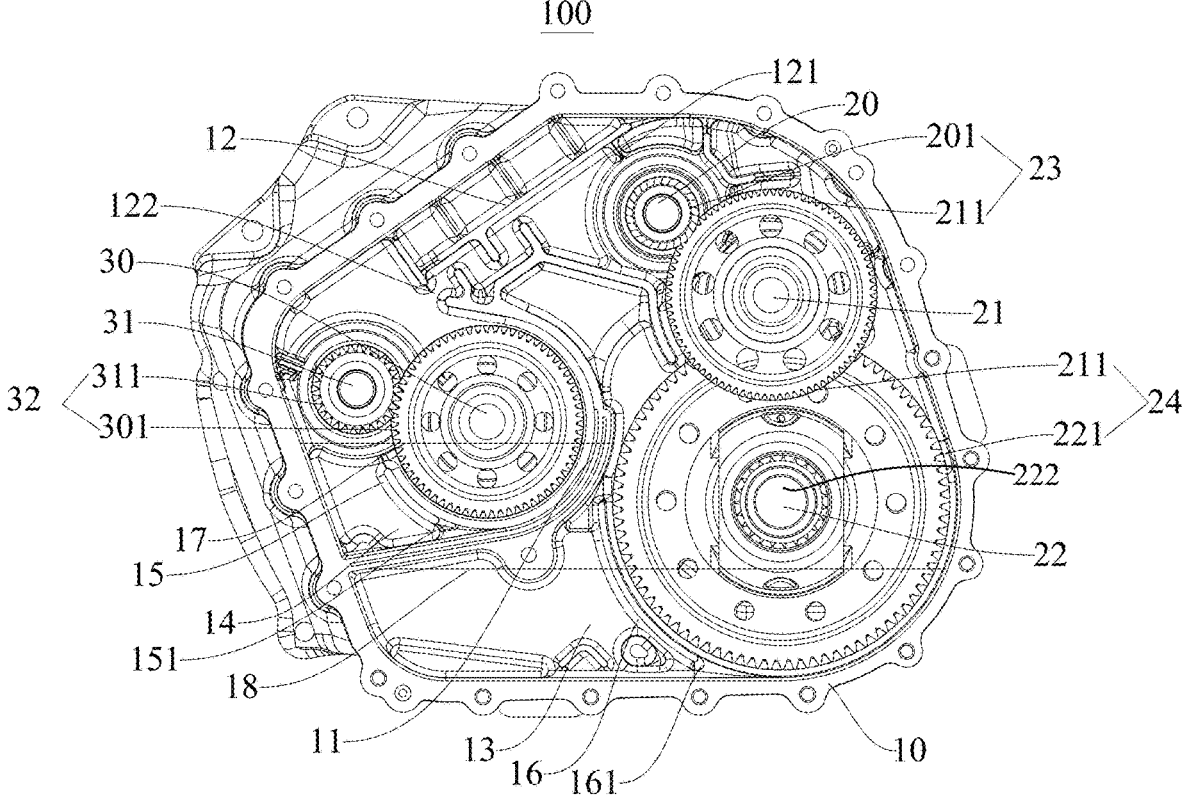
FIG. 2 is a schematic diagram of a transmission of a vehicle when the vehicle travels on a horizontal road surface according to an embodiment of the present disclosure.
Figure 3:
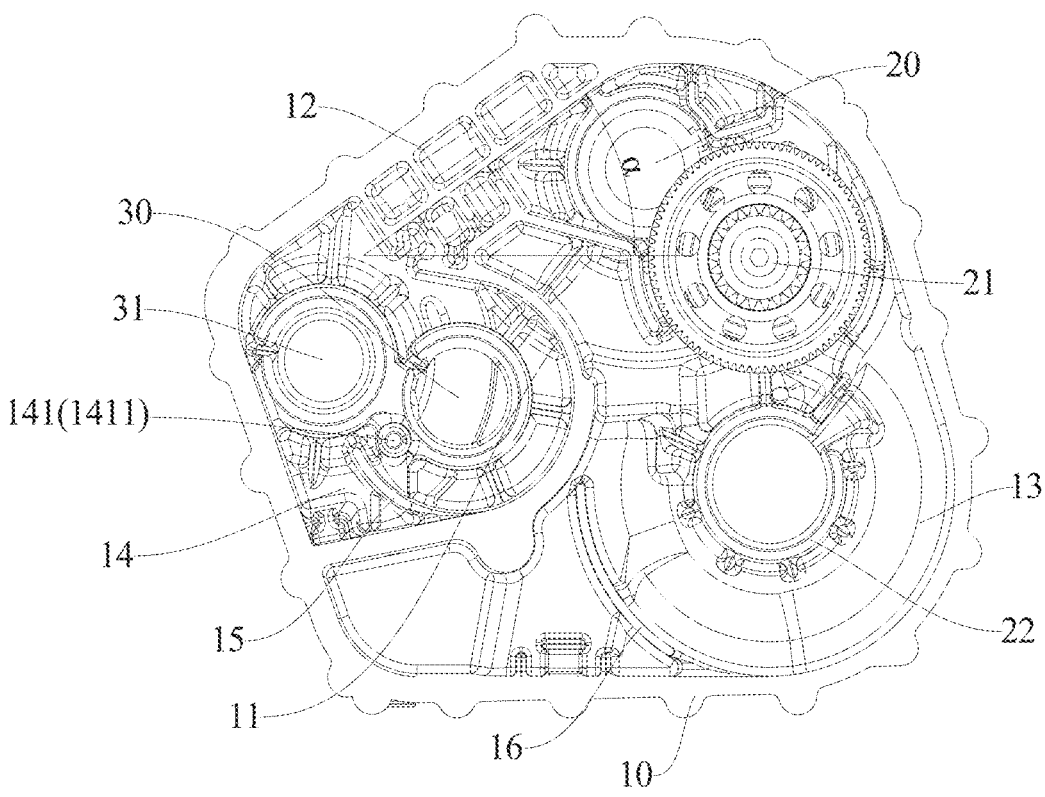
FIG. 3 is a schematic diagram of a transmission of a vehicle when the vehicle travels on a horizontal road surface according to another embodiment of the present disclosure.
Figure 4:
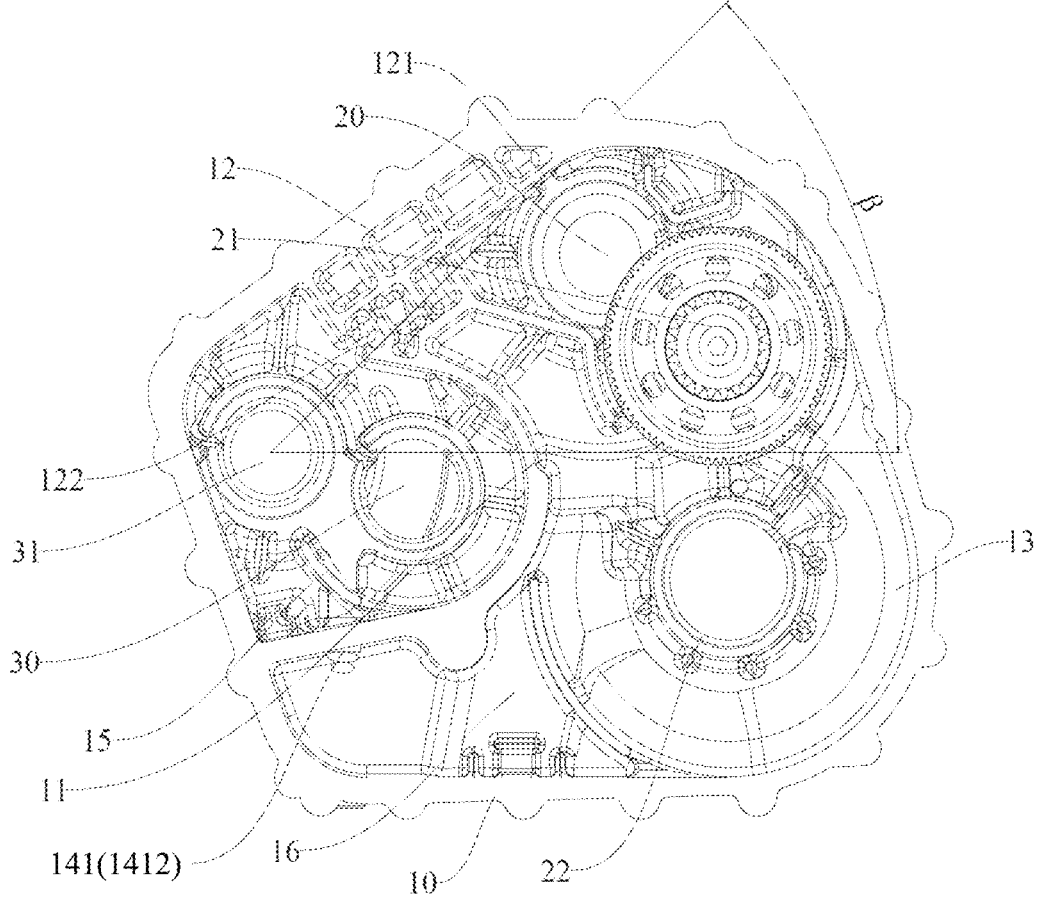
FIG. 4 is a schematic diagram of a transmission of a vehicle when the vehicle travels on a horizontal road surface according to still another embodiment of the present disclosure.

With reference to FIG. 2 to FIG. 4, the transmission 100 of a vehicle according to the embodiments of the present disclosure may mainly include: a housing 10 and a one-way oil channel 12. An isolation board 11 is arranged in the housing 10. A driving cavity 13 is provided on a side of the isolation board 11. A power generation cavity 14 is provided on the other side of the isolation board 11.

Specifically, the isolation board 11 is arranged in the housing 10, so that the driving cavity 13 and the power generation cavity 14 in the housing 10 can store oil relatively independently, and the oil may separately lubricate components in the driving cavity 13 and the power generation cavity 14. Through this arrangement, when a vehicle travels on a road surface that is inclined relative to a horizontal plane, for example, an uphill road surface or a downhill road surface, and the transmission 100 of a vehicle is inclined relative to the horizontal plane along with the vehicle, the oil in the driving cavity 13 and the oil in the power generation cavity 14 are relatively independent, and the oil in the power generation cavity 14 does not flow to the driving cavity 13 due to the inclination. In this way, it can be ensured that in this case, the component in the power generation cavity 14 is still fully in contact with the oil, and the oil in the power generation cavity 14 still sufficiently lubricates the component in the power generation cavity 14, so that reliability of the transmission 100 of a vehicle can be improved.

Further, the one-way oil channel 12 is located at a top of the driving cavity 13 and the power generation cavity 14. The one-way oil channel 12 is configured to guide oil from the driving cavity 13 to the power generation cavity 14 in a unidirectional manner. Specifically, the one-way oil channel 12 is located at the top of the driving cavity 13 and the power generation cavity 14. When the component in the driving cavity 13 runs normally, a part of the oil in the driving cavity 13 may be conveyed to the one-way oil channel 12, and the one-way oil channel 12 guides the oil to the power generation cavity 14. In this way, stability and reliability for the oil to enter the power generation cavity 14 from the driving cavity 13 can be ensured, and the inclination of the transmission 100 can be avoided. In addition, a case in which when the oil in the power generation cavity 14 does not reach a preset amount, the oil in the power generation cavity 14 enters the driving cavity 13 from the one-way oil channel 12, resulting in insufficient component lubrication in the power generation cavity 14 can be further avoided, thereby further improving the reliability of the transmission 100.

With reference to FIG. 2 to FIG. 4, after the oil in the driving cavity 13 enters the power generation cavity 14 and the oil in the power generation cavity 14 reaches the preset amount, there is excessive oil in the power generation cavity 14. A resistance caused by a viscous force of the oil to normal operation of the component in the power generation cavity 14 is excessively large. As a result, a churning loss of the component in the power generation cavity 14 is increased during normal operation, and transmission efficiency of the transmission 100 is reduced.

Therefore, the isolation board 11 separates an internal space of the housing 10 into the power generation cavity 14 and the driving cavity 13 that independently store oil, and causes the one-way oil channel 12 to guide the oil in the driving cavity 13 to the power generation cavity 14. In this way, when the vehicle travels on an uphill road section or a downhill road section, and the transmission 100 is inclined relative to the horizontal plane, sufficient oil is still stored in the power generation cavity 14 and the driving cavity 13 to lubricate the internal components, thereby ensuring the reliability of the transmission 100 of a vehicle.

According to some embodiments of the present disclosure, the transmission 100 further includes an oil drain mechanism 141. The oil drain mechanism 141 is arranged at a bottom of the power generation cavity 14. The oil drain mechanism 141 is configured to drain oil in the power generation cavity 14 to the driving cavity 13 when the oil in the power generation cavity 14 exceeds a preset amount. Therefore, the oil drain mechanism 141 is arranged at the bottom of the power generation cavity 14. When the oil in the power generation cavity 14 reaches the preset amount, the oil in the power generation cavity 14 can be drained into the driving cavity 13, and when the oil in the power generation cavity 14 is drained into the driving cavity 13 to be lower than the preset amount, the oil drain mechanism 141 stops draining. This can ensure that the oil in the power generation cavity 14 is always in a reasonable range. Therefore, when the oil in the power generation cavity 14 exceeds the preset amount, the oil is drained into the driving cavity 13 by using the oil drain mechanism 141, which can avoid excessive oil in the power generation cavity 14 and reduce the churning loss of the component in the power generation cavity 14.

In addition, the one-way oil channel 12 and the oil drain mechanism 141 may jointly form a loop oil channel. The loop oil channel not only allows the oil in the driving cavity 13 and the oil in the power generation cavity 14 to circulate with each other, but also can always maintain a sufficient amount of oil in the power generation cavity 14, so that it is ensured that a driving lubrication condition is not affected by a working condition or a road condition.

With reference to FIG. 2 to FIG. 4, the transmission 100 further includes a driving transmission assembly. The driving transmission assembly includes a driving motor shaft 20, an intermediate shaft 21, a first transmission gear pair 23, a differential input shaft 222, and a differential gear 221. One end of the driving motor shaft 20 is configured to connect to a driving motor 42, and the other end of the driving motor shaft 20 runs through the driving cavity 13. The intermediate shaft 21 is at least partially arranged in the driving cavity 13. The first transmission gear pair 23 is arranged on the driving motor shaft 20 and the intermediate shaft 21 and located in the driving cavity 13. The differential input shaft 222 is at least partially arranged in the driving cavity. The differential gear 221 is arranged on the differential input shaft 222 and located in the driving cavity 13. The differential gear 221 is configured to perform power transmission between the intermediate shaft 21 and the differential input shaft 222.

In some embodiments, a second transmission gear pair 24 is arranged between the intermediate shaft 21 and a differential 22 (for example, the differential gear 221 of the differential 22). Specifically, the driving motor shaft 20, the intermediate shaft 21, and the differential input shaft 222 are arranged in the driving cavity 13, the first transmission gear pair 23 is arranged between the driving motor shaft 20 and the intermediate shaft 21, the second transmission gear pair 24 is arranged between the intermediate shaft 21 and the differential 22, power generated by the driving motor 42 may be transmitted to the intermediate shaft 21 by using the first transmission gear pair 23 between the driving motor shaft 20 and the intermediate shaft 21, and the intermediate shaft 21 may transmit the power to the differential 22 by using the second transmission gear pair 24, so that the power generated by the driving motor 42 is transmitted to wheels of the vehicle by using the driving motor shaft 20, and the vehicle is driven, to cause the vehicle to travel normally.

Further, the driving motor shaft 20, the intermediate shaft 21, and the differential input shaft 222 are vertically arranged at intervals in the driving cavity 13 in sequence. The differential input shaft 222 is configured to throw the oil at the bottom of the driving cavity 13 onto the intermediate shaft 21 and the driving motor shaft 20 through rotation, so that the oil in the driving cavity 13 lubricates the differential 22 (especially the differential input shaft 222) and a bearing of the differential 22, lubricates the intermediate shaft 21 and a bearing of the intermediate shaft 21, and lubricates the driving motor shaft 20 and a bearing of the driving motor shaft 20. In this way, stability and smoothness of transmission between the driving motor shaft 20, the intermediate shaft 21, and the differential input shaft 222 in the driving cavity 13 can be ensured, and transmission efficiency can be ensured.

In addition, the first transmission gear pair 23 includes a driving motor gear 201 and an intermediate gear 211 meshing with each other. The driving motor gear 201 is arranged on the driving motor shaft 20, and the intermediate gear 211 is arranged on the intermediate shaft 21. The differential gear 221 meshes with the intermediate gear 211 to form the second transmission gear pair 24. The differential gear 221 rotates to throw the oil onto the intermediate shaft 21 and the driving motor shaft 20. The intermediate gear 211 and the driving motor gear 201 are configured to throw the oil into the one-way oil channel 12. Through this arrangement, no auxiliary component (for example, an oil pump and a hydraulic clutch) is required to assist the oil in entering the one-way oil channel 12 from the driving cavity 13 while ensuring that the transmission is stable and reliable, so that the oil can smoothly enter the one-way oil channel 12 from the driving cavity 13. In this way, a structural design of the transmission 100 of a vehicle can be simplified, so that difficulty in manufacturing and production of the transmission 100 of a vehicle can be reduced, and a volume of the transmission 100 of a vehicle can be reduced.

The intermediate gear 211 includes a small intermediate gear 2111 and a large intermediate gear 2110. The driving motor gear 201 meshes with the large intermediate gear 2110 to form the first transmission gear pair 23. The differential gear 221 meshes with the small intermediate gear 2111 to form the second transmission gear pair 24. An outer diameter of the large intermediate gear 2110 is greater than an outer diameter of the small intermediate gear 2111.

In addition, a radius of the driving motor gear 201, a radius of the intermediate gear 211, and a radius of the differential gear 221 increase in sequence, so that smoothness and reliability for the oil at the bottom of the driving cavity 13 to enter the one-way oil channel 12 at the top of the driving cavity 13 can be improved.

With reference to FIG. 2 to FIG. 4, the transmission 100 further includes a power generation driving assembly. The power generation driving assembly includes an engine input shaft 30, a power generator shaft 31, and a third transmission gear pair 32. One end of the engine input shaft 30 is configured to connect to an engine. The engine input shaft 30 is at least partially arranged in the power generation cavity 14. One end of the power generator shaft 31 is configured to connect to a power generator. The power generator shaft 31 is at least partially arranged in the power generation cavity 14. The third transmission gear pair 32 is arranged between the engine input shaft 30 and the power generator shaft 31. Specifically, the third transmission gear pair 32 is arranged between the engine input shaft 30 and the power generator shaft 31, so that power generated by the engine 40 can enter the power generator shaft 31 by using the third transmission gear pair 32 between the engine input shaft 30 and the power generator shaft 31, and then enter the power generator 41, to cause the power generator 41 to generate power.

Further, the third transmission gear pair 32 includes an engine input gear 301 and a power generator input gear 311. The engine input gear 301 is arranged on the engine input shaft 30 and located in the power generation cavity 14. The power generator input gear 311 is arranged on the power generator input shaft and meshes with the engine input gear 301. In a height direction, a central axis of the power generator input gear 311 is higher than a central axis of the engine input gear 301. FIG. 2 is used as an example. The "height direction" refers to a vertical direction in FIG. 2. For example, the engine input gear 301 and the power generator input gear 311 are respectively arranged on the engine input shaft 30 and the power generator shaft 31, and the engine input gear 301 and the power generator input gear 311 mesh with each other, and together form the third transmission gear pair 32. The power generator input gear 311 is arranged above the engine input gear 301, and a radius of the engine input gear 301 is greater than a radius of the power generator input gear 311. The engine input gear 301 and the power generator input gear 311 mesh with each other for transmission, so that the oil at the bottom of the power generation cavity 14 can be conveyed to the power generator shaft 31, and the oil respectively lubricates the power generator shaft 31, a bearing of the power generator shaft 31, the engine input shaft 30, and a bearing of the engine input shaft 30. In this way, the engine input shaft 30 and the power generator shaft 31 can be lubricated more adequately.

With reference to FIG. 2 to FIG. 4, in a static state of the transmission 100, a horizontal line in which the engine input shaft 30 is located is higher than a horizontal line in which an axis of the differential 22 is located. In this way, a first oil level 17 in the power generation cavity 14 can be higher than a second oil level 18 in the driving cavity 13. Through this arrangement, it can be ensured that the oil is always stored in the driving cavity 13 and the power generation cavity 14, and it can be further ensured that the component in the driving cavity 13 and the component in the power generation cavity 14 are adequately lubricated. In addition, a case in which excessive oil in the driving cavity 13 and the power generation cavity 14 causes excessively large churning losses of the component in the driving cavity 13 and the component in the power generation cavity 14 can be further avoided, thereby further improving structural reliability of the transmission 100 of a vehicle. It should be noted that the static state of the transmission 100 refers to a state of the transmission 100 when the vehicle travels on a horizontal road surface or stops.

Figure 5:
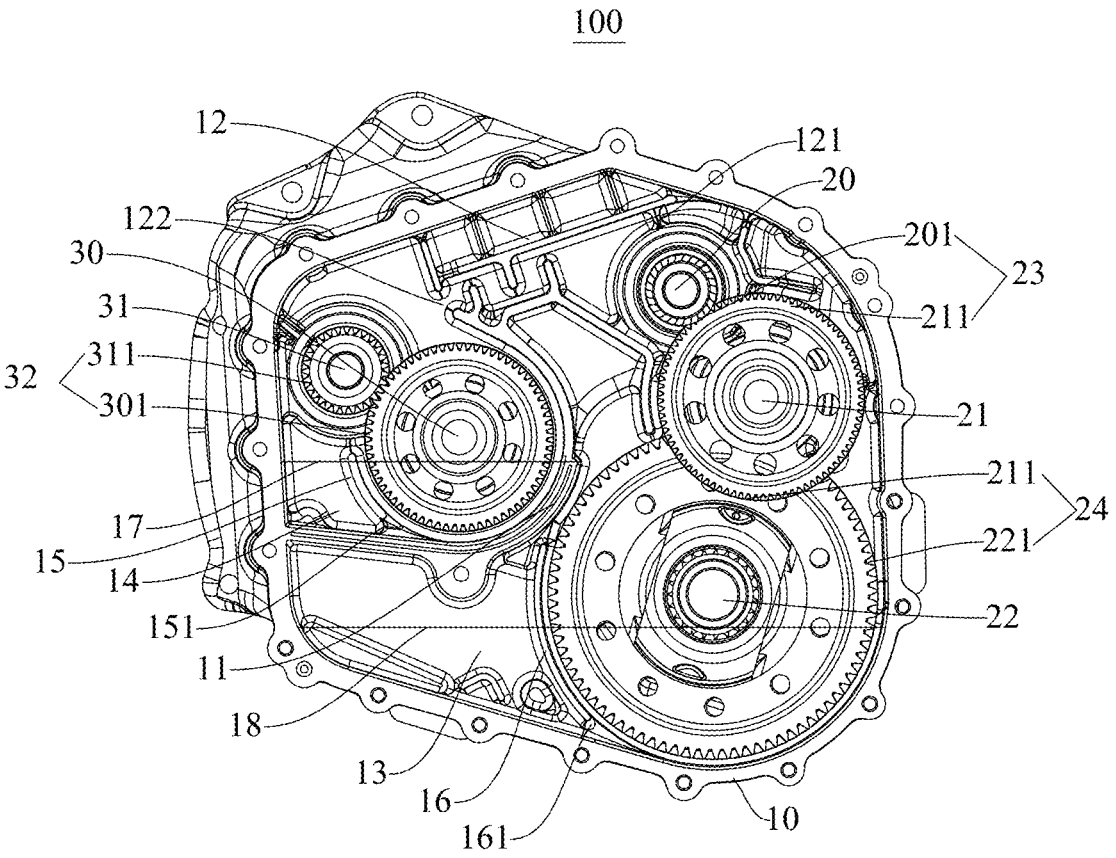
FIG. 5 is a schematic diagram of a transmission of a vehicle when the vehicle travels on an uphill road surface according to an embodiment of the present disclosure.

With reference to FIG. 5, when the vehicle travels on an uphill road surface with a gradient, the power generation cavity 14 rises in a vertical direction relative to a central axis of the differential 22. In this case, a height difference between the first oil level 17 in the power generation cavity 14 and the second oil level 18 in the driving cavity 13 increases.

Figure 6:
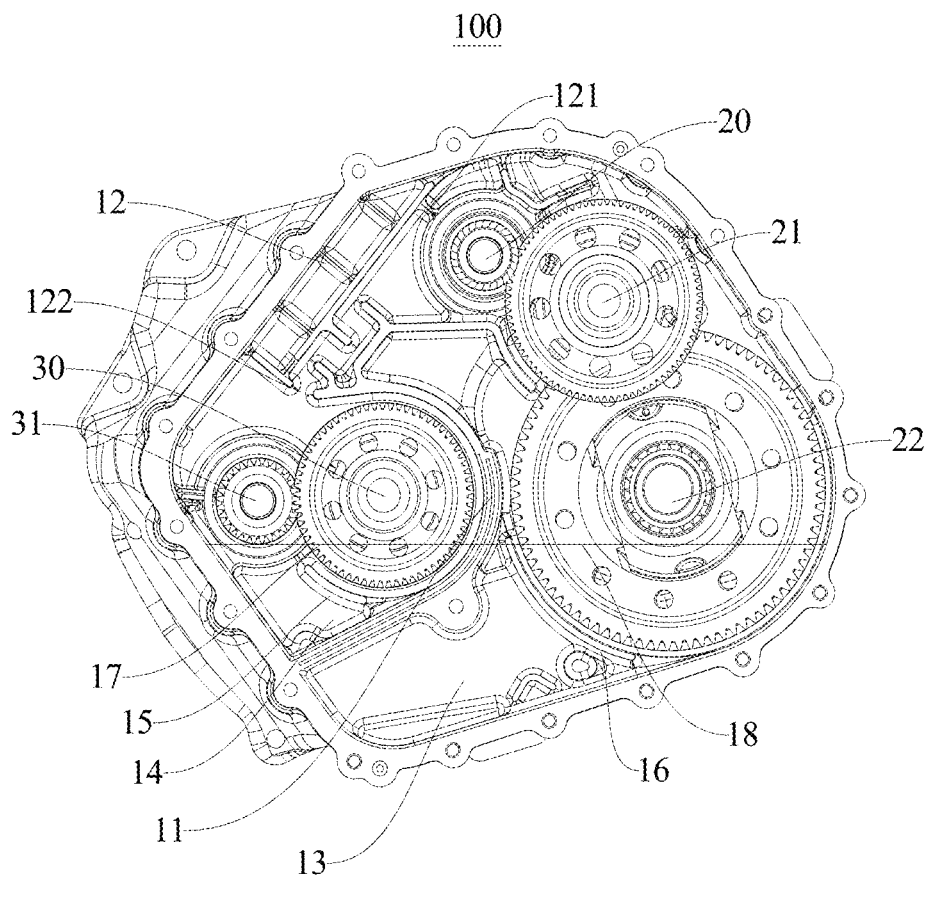
FIG. 6 is a schematic diagram of a transmission of a vehicle when the vehicle travels on a downhill road surface according to an embodiment of the present disclosure.

With reference to FIG. 6, when the vehicle travels on a downhill road surface with a gradient, the power generation cavity 14 falls in the vertical direction relative to the central axis of the differential 22. In this case, the height difference between the first oil level 17 in the power generation cavity 14 and the second oil level 18 in the driving cavity 13 decreases, and even the first oil level 17 in the power generation cavity 14 coincides with the second oil level 18 in the driving cavity 13.

In some embodiments of the present disclosure, with reference to FIG. 2 and FIG. 3, the oil drain mechanism 141 is configured as an oil drain pipe. The oil drain pipe is in communication with the power generation cavity 14 and the driving cavity 13, and one end of the oil drain pipe in communication with the power generation cavity 14 is an oil drain port. In the height direction, the oil drain port is located between the central axis of the engine input gear 301 and a lowest point of the engine input gear. FIG. 2 is used as an example. The "height direction" refers to the vertical direction.

For example, the engine input gear 301 is arranged on the engine input shaft 30. The oil drain port 1411 of the oil drain pipe is arranged between a plane in which a center of the engine input gear 301 is located and a plane in which the lowest point of the engine input gear 301 is located. Specifically, the oil drain port 1411 of the oil drain pipe is arranged between the center of the engine input gear 301 and the lowest point of the engine input gear 301. Because of a process setting requirement of the transmission 100, the bottom of the power generation cavity 14 is higher than the bottom of the driving cavity 13, and the oil drain pipe extends upward and downward. When the oil in the power generation cavity 14 is higher than the oil drain port 1411, the oil in the power generation cavity 14 enters the oil drain pipe from the oil drain port 1411, and directly enters the driving cavity 13 from the oil drain pipe under the action of gravity. In this way, a process in which the oil enters the driving cavity 13 through the oil drain port 1411 can be more simple and direct. Further, it can be ensured that the oil in the power generation cavity 14 is always higher than the lowest point of the engine input gear 301, that is, the engine input gear 301 can be always in contact with the oil regardless of the type of road surface on which the vehicle travels, and the oil is thrown to the power generator shaft 31 through rotation, to lubricate the engine input gear 301, the bearing of the engine input gear 301, the power generator shaft 31, and the bearing of the power generator shaft 31. In addition, it can be ensured that the oil in the power generation cavity 14 is always lower than the center of the engine input gear 301, so that a case in which an oil height in the power generation cavity 14 is higher than the center of the engine input gear 301, causing an increase in a churning loss of the engine input shaft 30 is avoided while ensuring that the power generator shaft 31 and the engine input shaft 30 are adequately lubricated. In this way, a relatively balanced state can be achieved between transmission efficiency and adequate lubrication of the transmission 100, thereby improving the structural reliability of the transmission 100.

With reference to FIG. 2 to FIG. 6, a first oil baffle 15 is arranged in the power generation cavity 14. The first oil baffle 15 is arranged at a bottom of the engine input gear 301. One end of the first oil baffle 15 is connected to the isolation board 11. The first oil baffle 15 is provided with a first opening 151, and the first opening 151 is close to a joint between the first oil baffle 15 and the isolation board 11. Specifically, the first oil baffle 15 is arranged at the bottom of the engine input gear 301, one end of the first oil baffle 15 is connected to the isolation board 11, and the other end of the first oil baffle 15 extends to fit a shape of the engine input gear 301. The first oil baffle 15 and the isolation board 11 may jointly block two sides of the engine input gear 301. In this way, the first oil baffle 15 and the isolation board 11 can jointly protect the engine input gear 301. In addition, the first oil baffle 15 and the isolation board 11 block the oil thrown to the two sides of the engine input gear 301 while ensuring smooth rotation of the engine input gear 301 and ensuring that the engine input gear 301 throws the oil at the bottom of the power generation cavity 14 upward, so that the oil can quickly fall back to the bottom of the power generation cavity 14 under the action of gravity for the engine input gear 301 to throw upward.

Optionally, the first oil baffle 15 is of an arc-shaped structure, and the first oil baffle 15 is arranged around an outer edge of the engine input gear 301, and spaced apart from the outer edge of the engine input gear 301 by a gap.

Further, because the first oil baffle 15 is connected to the isolation board 11, and the bottom of the engine input gear 301 is in a relatively isolated state, after the engine input gear 301 throws the oil upward, the oil at the bottom of the engine input gear 301 is reduced. Therefore, the first opening 151 is provided on the first baffle, and the first opening 151 is close to the joint between the first oil baffle 15 and the isolation board 11. The oil that is in the power generation cavity 14 and that is on an outer side of the first oil baffle 15 may enter the bottom of the engine input gear 301 through the first opening 151. This ensures sufficient amount of oil at the bottom of the engine input gear 301, and further ensures that the component in the power generation cavity 14 is adequately lubricated.

In addition, a diameter of the first opening 151 is defined as d1, and d1 satisfies a relational expression: $5 \text{ mm} \leq d1 \leq 15$ mm. Specifically, the first opening 151 may control, when the engine input shaft 30 runs, a flow of the oil that is in the power generation cavity 14 and that is on the outer side of the first oil baffle 15 flowing into the bottom of the engine input gear 301. The diameter d1 of the first opening 151 is set in a reasonable range, so that a case in which the churning loss during rotation of the engine input gear 301 is increased due to an excessively large diameter of the first opening 151 can be avoided, and a case in which replenishment of the oil at the bottom of the engine input shaft 30 is not timely due to an excessively small diameter of the first opening 151 can also be avoided, thereby avoiding poor lubrication of the engine input shaft 30, the bearing of the engine input shaft 30, the power generator shaft 31, and the bearing of the power generator shaft 31.

With reference to FIG. 2 to FIG. 6, a second oil baffle 16 is arranged in the driving cavity 13. The second oil baffle 16 is arranged at a bottom of an outer edge of the differential gear 221. One end of the second oil baffle 16 is connected to the isolation board 11. The second oil baffle 16 is provided with a second opening 161, and the second opening 161 is close to a joint between the second oil baffle 16 and the isolation board 11. Specifically, the second oil baffle 16 is arranged at the bottom of the outer edge of the differential gear 221, one end of the second oil baffle 16 is connected to the isolation board 11, and the other end of the second oil baffle 16 extends to fit a shape of the differential gear 221. The second oil baffle 16 and the isolation board 11 may jointly block two sides of the differential gear 221. In this way, the second oil baffle 16 can protect the differential gear 221. In addition, the second oil baffle 16 and the isolation board 11 block the oil thrown to the two sides of the differential gear 221 while ensuring smooth rotation of the differential gear 221 and ensuring that the differential gear 221 throws the oil at the bottom of the driving cavity 13 upward, so that the oil can quickly fall back to the bottom of the driving cavity 13 under the action of gravity for the differential gear 221 to throw.

Further, because the second oil baffle 16 is connected to the isolation board 11, and the bottom of the differential gear 221 is in a relatively isolated state, after the differential gear 221 throws the oil upward, the oil at the bottom of the differential gear 221 is reduced. Therefore, the second opening 161 is provided on the second oil baffle 16, and the second opening 161 is close to the joint between the second oil baffle 16 and the isolation board 11. The oil that is in the driving cavity 13 and that is on an outer side of the second oil baffle 16 may enter the bottom of the differential gear 221 through the second opening 161. This ensures sufficient amount of oil at the bottom of the differential gear 221, and further ensures that the component in the driving cavity 13 is adequately lubricated.

In addition, a diameter of the second opening 161 is defined as d2, and d2 satisfies a relational expression: 5 mm$\leq$d2$\leq$15 mm. Specifically, the second opening 161 may control, when the differential gear 221 runs, a flow of the oil that is in the driving cavity 13 and that is on the outer side of the second oil baffle 16 flowing into the bottom of the differential gear 221. The diameter d2 of the second opening 161 is set in a reasonable range, so that a case in which the churning loss during rotation of the differential gear 221 is increased due to an excessively large diameter of the second opening 161 can be avoided, and a case in which replenishment of the oil at the bottom of the differential gear 221 is not timely due to an excessively small diameter of the second opening 161 can also be avoided, thereby avoiding poor lubrication of the driving motor shaft 20, the bearing of the driving motor shaft 20, the intermediate shaft 21, the bearing of the intermediate shaft 21, the differential 22, and the bearing of the differential 22.

With reference to FIG. 3, an angle between an axis of the one-way oil channel 12 and a horizontal line is defined as a, and a satisfies a relational expression: 16°$<\alpha<$90°. Specifically, the angle between the axis of the one-way oil channel 12 and a horizontal plane is set in a reasonable range, so that a case in which a relatively large occupied space of the one-way oil channel 12 in the transmission 100 due to an excessively large angle between the axis of the one-way oil channel 12 and the horizontal plane causes inconvenient arrangement of the one-way oil channel 12 in the transmission 100 can be avoided, and a case in which the angle between the axis of the one-way oil channel 12 and the horizontal plane is excessively small, and after the oil enters the maze oil channel from an oil inlet port 121, a gravity component of the oil is excessively small, the oil cannot flow in the maze oil channel due to a viscous force, and the oil cannot enter the power generation cavity 14 from the driving cavity 13 can also be avoided, thereby further optimizing a structural design of the maze oil channel.

Further, in actual life, the gradient of the downhill road surface or the uphill road surface does not exceed 30%. Otherwise, when the vehicle travels on the downhill road surface or the downhill road surface, the vehicle slides, causing a safety accident of the vehicle. When the vehicle travels on the uphill road surface or the downhill road surface whose gradient is 30%, an inclined angle of the one-way oil channel 12 of the transmission 100 relative to the one-way oil channel 12 when the vehicle travels on a horizontal road surface is approximately 16.5°. Therefore, the angle $\alpha$ between the axis of the one-way oil channel 12 and the horizontal line is set to be greater than 16° and less than 90°. In this way, a case in which when the vehicle travels on the uphill road section or the downhill road section, a flow direction of the oil in the one-way oil channel 12 is reversed, and the oil flows to the driving cavity 13 from the power generation cavity 14 under the action of gravity component, resulting in inadequate lubrication of the power generation cavity 14 can be avoided, thereby further improving the structural reliability of the transmission 100.

With reference to FIG. 2 to FIG. 4, the one-way oil channel 12 has an oil inlet port 121 and an oil outlet port 122, the oil in the driving cavity 13 is sputtered to the one-way oil channel 12 through the oil inlet port 121, and the oil in the one-way oil channel 12 flows to the power generation cavity 14 through the oil outlet port 122. Specifically, after the differential gear 221 and the intermediate gear 211 rotate, and the oil is thrown upward, the oil may enter the one-way oil channel 12 from the oil inlet port 121, flow to the oil outlet port 122 under the action of gravity component, and flow to the power generation cavity 14 from the oil outlet port 122. In this way, smoothness and stability of oil inlet and oil outlet of the one-way oil channel 12 can be ensured, and a structural design of the one-way oil channel 12 can be further simplified.

With reference to FIG. 4, an angle between a connection line between the oil inlet port 121 and a center of the power generator shaft 31 and the horizontal line is defined as $\beta$, and $\beta$ satisfies a relational expression: 30°$<\beta<$90°. Specifically, when the vehicle travels on an uphill road surface or a downhill road surface, the one-way oil channel 12 is inclined relative to a state of the one-way oil channel 12 when the vehicle travels on the horizontal road surface. The angle $\beta$ between the connection line between the oil inlet port 121 and the center of the power generator shaft 31 and the horizontal line is set to be greater than 30° and less than 90°, so that when the one-way oil channel 12 when the vehicle travels on the uphill road surface or the downhill road surface is inclined relative to the state of the one-way oil channel 12 when the vehicle travels on the horizontal road surface, a case in which the oil thrown by the engine input gear 301 and the power generator input gear 311 enters the driving cavity 13 from the oil inlet port 121 can be avoided, thereby improving reliability of guiding the oil in the unidirectional manner of the one-way oil channel 12 completely.

In some embodiments of the present disclosure, with reference to FIG. 4 and FIG. 6, the oil drain mechanism 141 is configured as an oil drain valve 1412. The oil drain valve 1412 is configured to be opened to drain excess oil to the driving cavity 13 when an amount of oil in the power generation cavity 14 exceeds a preset oil amount value. Specifically, the oil drain mechanism 141 is set as the oil drain valve 1412. When the amount of oil in the power generation cavity 14 exceeds the preset oil amount value, the oil drain valve 1412 is opened and may drain the excess oil to the driving cavity 13. When the amount of the oil in the power generation cavity 14 does not exceed the preset oil amount value, the oil drain valve 1412 is closed, and the oil in the power generation cavity 14 stops entering the driving cavity 13. In this way, a case in which excessive oil in the power generation cavity 14 causes an increase in a churning loss of the engine input shaft 30 can be avoided, it can be ensured that a specific amount of oil is always stored in the power generation cavity 14, and it can be ensured that the component in the power generation cavity 14 is adequately lubricated.

It should be noted that when the oil drain mechanism 141 is the oil drain valve 1412, the oil drain valve 1412 does not need to consider a height set in the power generation cavity 14. In this way, the oil drain valve 1412 can be conveniently mounted and arranged in the power generation cavity 14, and arrangement difficulty of the oil drain valve 1412 can be reduced.

With reference to FIG. 1 and with reference to FIG. 2 to FIG. 6, a powertrain 1000 according to an embodiment of the present disclosure may mainly include: an engine 40, a power generator 41, a driving motor 42, and a transmission 100. A driving transmission assembly is arranged in the driving cavity 13. A power generation driving assembly is arranged in the power generation cavity 14. An input end of the driving transmission assembly is connected to the driving motor 42. An output end of the driving transmission assembly is configured to connect to wheels. An input end of the power generation driving assembly is configured to connect to the engine 40. An output end of the power generation transmission assembly is configured to connect to a power battery 43.

Further, the power generator 41 is connected to the engine 40 in a transmission manner. The driving cavity 13 and the power generation cavity 14 are provided in the transmission 100 and the differential 22 is arranged in the transmission 100. The driving cavity 13 and the power generation cavity 14 each independently store oil, a shaft component connected to the engine 40 and a shaft component connected to the power generator 41 are arranged in the power generation cavity 14, and a shaft component connected to the driving motor 42, the differential 22, and shaft components for transmission of the driving motor 42 and the differential 22 are arranged in the driving cavity 13.

Specifically, the foregoing transmission 100 is arranged in the powertrain 1000, and the shaft component connected to the engine 40 and the shaft component connected to the power generator 41 are arranged in the power generation cavity 14, and the shaft component connected to the driving motor 42, the differential 22, and the shaft components for transmission of the driving motor 42 and the differential 22 are arranged in the driving cavity 13. In this way, it can be always ensured that the powertrain 1000 is adequately lubricated, and transmission efficiency of the powertrain 1000 can be further improved.

Further, the powertrain 1000 of a vehicle has a pure electric mode, a driving charging mode, an extended range driving mode, and an energy recovery mode. When the powertrain 1000 of a vehicle is in the pure electric mode, the engine 40 does not work, the driving motor 42 receives electric energy provided by the power battery 43 to drive the vehicle, and the power generator 41 receives a driving force generated by the engine 40 to generate power, and stores electric energy in the power battery 43.

When the vehicle is in the driving charging mode, the power generator 41 receives the driving force generated by the engine 40 to generate power, stores a part of electric energy in the power battery 43, transmits the remaining electric energy to the driving motor 42, and drives the wheels by using the differential 22 in the transmission 100.

When the vehicle is in the extended range driving mode, the power generator 41 receives the driving force generated by the engine 40 to generate power, transmits the electric energy to the driving motor 42, and drives the wheels by using the differential 22 in the transmission 100. In this mode, the battery may perform energy supplement on the driving motor 42 according to a working condition.

When the vehicle is in the energy recovery mode, and when the vehicle is in a braking or deceleration condition, the wheels transmit energy to the driving motor 42, and the driving motor 42 generates power and stores electric energy in the power battery 43.

Figure 7:
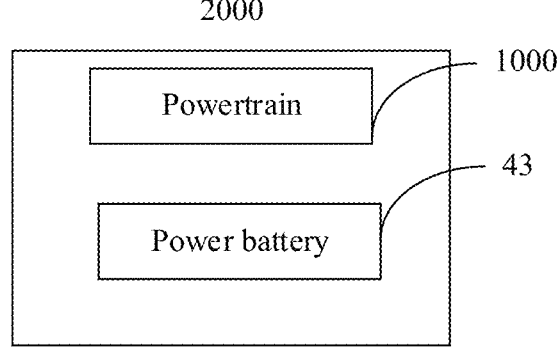
FIG. 7 is a schematic block diagram of a vehicle according to an embodiment of the present disclosure.

As shown in FIG. 7, a vehicle 2000 according to an embodiment of the present disclosure may mainly include the powertrain 1000 and a power battery 43. The power battery 43 is connected to the powertrain 1000. The power battery 43 is connected to the power generator 41 and the driving motor 42. The foregoing powertrain 1000 is arranged in the vehicle 2000, so that structural reliability of the vehicle 2000 can be improved, and a failure rate of the vehicle 2000 can be reduced, and a structural design of the vehicle 2000 can be further simplified.

In the descriptions of the present disclosure, it should be understood that, orientations or position relationships indicated by terms such as "center", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", and "circumferential" are orientations or position relationship shown based on the accompanying drawings, and are merely used for describing the present disclosure and simplifying the description, rather than indicating or implying that the apparatus or element should have a particular orientation or be constructed and operated in a particular orientation, and therefore, should not be construed as a limitation on the present disclosure.

In the descriptions of this specification, the descriptions of the reference terms such as "an embodiment", "some embodiments", "exemplary embodiments", "example", "specific example", or "some examples" mean that the specific features, structures, materials or characteristics described with reference to the embodiment or example are included in at least one embodiment or example of the present disclosure. In this specification, schematic descriptions of the foregoing terms do not necessarily direct at a same embodiment or example.

Although the embodiments of the present disclosure have been shown and described above, a person of ordinary skill in the art should understand that various changes, modifications, replacements, and variations may be made to the embodiments without departing from the principles and spirit of the present disclosure, and the scope of the present disclosure is defined by the appended claims and their equivalents.

What is claimed is:

1. A transmission of a vehicle, comprising:
   a housing, an isolation board being arranged in the housing, a driving cavity being provided on a side of the isolation board, and a power generation cavity being provided on the other side of the isolation board;
   a one-way oil channel, the one-way oil channel being located at a top of the driving cavity and the power generation cavity, and the one-way oil channel being configured to guide oil from the driving cavity to the power generation cavity in a unidirectional manner;
   an oil drain mechanism, the oil drain mechanism being arranged at a bottom of the power generation cavity, and the oil drain mechanism being configured to drain oil in the power generation cavity to the driving cavity when the oil in the power generation cavity exceeds a preset amount; and

a power generation driving assembly, the power generation driving assembly comprising:

an engine input shaft, one end of the engine input shaft being configured to connect to an engine, and the engine input shaft being at least partially arranged in the power generation cavity;

a power generator shaft, one end of the power generator shaft being configured to connect to a power generator, and the power generator shaft being at least partially arranged in the power generation cavity; and a third transmission gear pair, the third transmission gear pair being arranged between the engine input shaft and the power generator shaft, wherein the third transmission gear pair comprises:

an engine input gear, wherein the engine input gear is arranged on the engine input shaft and located in the power generation cavity; and a power generator input gear, wherein the power generator input gear is arranged on the power generator input shaft and meshes with the engine input gear, wherein in a height direction, a central axis of the power generator input gear is higher than a central axis of the engine input gear.

2. The transmission of a vehicle according to claim 1, further comprising a driving transmission assembly, the driving transmission assembly comprising:

a driving motor shaft, one end of the driving motor shaft being configured to connect to a driving motor, and the other end of the driving motor shaft running through the driving cavity;

an intermediate shaft, the intermediate shaft being at least partially arranged in the driving cavity;

a first transmission gear pair, the first transmission gear pair being arranged on the driving motor shaft and the intermediate shaft and located in the driving cavity;

a differential input shaft, at least partially arranged in the driving cavity; and a differential gear, the differential gear being arranged on the differential input shaft and located in the driving cavity, and the differential gear being configured to perform power transmission between the intermediate shaft and the differential input shaft.

3. The transmission of a vehicle according to claim 2, wherein the driving motor shaft, the intermediate shaft, and the differential input shaft are vertically arranged at intervals in the driving cavity in sequence, and the differential input shaft is configured to throw oil at a bottom of the driving cavity onto the intermediate shaft and the driving motor shaft through rotation.

4. The transmission of a vehicle according to claim 2, wherein the first transmission gear pair comprises a driving motor gear and an intermediate gear meshing with each other, the driving motor gear is arranged on the driving motor shaft, and the intermediate gear is arranged on the intermediate shaft; and the differential gear meshes with the intermediate gear to form a second transmission gear pair, the differential gear rotates to throw the oil onto the intermediate shaft and the driving motor shaft, and the intermediate gear and the driving motor gear are configured to throw the oil into the one-way oil channel.

5. The transmission of a vehicle according to claim 4, wherein the intermediate gear comprises a small intermediate gear and a large intermediate gear, the driving motor gear meshes with the large intermediate gear to form the first transmission gear pair, the differential gear meshes with the small intermediate gear to form the second transmission gear pair, and an outer diameter of the large intermediate gear is greater than an outer diameter of the small intermediate gear.

6. The transmission of a vehicle according to claim 2, wherein a second oil baffle is arranged in the driving cavity, the second oil baffle is arranged at a bottom of an outer edge of the differential gear, one end of the second oil baffle is connected to the isolation board, the second oil baffle is provided with a second opening, and the second opening is close to a joint between the second oil baffle and the isolation board.

7. The transmission of a vehicle according to claim 6, wherein a diameter of the second opening is defined as d2, and d2 satisfies a relational expression: 5 mm≤d2≤15 mm.

8. The transmission of a vehicle according to claim 1, wherein in a static state of the transmission, a horizontal line in which the engine input shaft is located is higher than a horizontal line in which an axis of a differential is located.

9. The transmission of a vehicle according to claim 1, wherein the oil drain mechanism is configured as an oil drain pipe, the oil drain pipe is in communication with the power generation cavity and the driving cavity, and one end of the oil drain pipe in communication with the power generation cavity is an oil drain port, wherein in the height direction, the oil drain port is located between the central axis of the engine input gear and a lowest point of the engine input gear.

10. The transmission of a vehicle according to claim 1, wherein a first oil baffle is arranged in the power generation cavity, the first oil baffle is arranged at a bottom of the engine input gear, one end of the first oil baffle is connected to the isolation board, the first oil baffle is provided with a first opening, and the first opening is close to a joint between the first oil baffle and the isolation board.

11. The transmission of a vehicle according to claim 10, wherein a diameter of the first opening is defined as d1, and d1 satisfies a relational expression: 5 mm≤d1≤15 mm.

12. The transmission of a vehicle according to claim 1, wherein the first oil baffle is of an arc-shaped structure, and the first oil baffle is arranged around an outer edge of the engine input gear, and spaced apart from the outer edge of the engine input gear by a gap.

13. The transmission of a vehicle according to claim 1, wherein an angle between an axis of the one-way oil channel and a horizontal line is defined as a, and a satisfies a relational expression: $16° < \alpha < 90°$.

14. The transmission of a vehicle according to claim 1, wherein the one-way oil channel has an oil inlet port and an oil outlet port, the oil in the driving cavity is sputtered to the one-way oil channel through the oil inlet port, and the oil in the one-way oil channel flows to the power generation cavity through the oil outlet port.

15. The transmission of a vehicle according to claim 14, wherein an angle between a connection line between the oil inlet port and a center of the power generator shaft and a horizontal line is defined as β, and β satisfies a relational expression:

$$30° < \beta < 90°.$$

16. The transmission of a vehicle according to claim 1, wherein the oil drain mechanism is configured as an oil drain valve, and the oil drain valve is configured to be opened to drain excess oil to the driving cavity when an amount of oil in the power generation cavity exceeds a preset oil amount value.

17. A powertrain, comprising:

an engine;

a power generator, the power generator being connected to the engine in a transmission manner;

a driving motor; and a transmission of a vehicle comprising:

a housing, an isolation board being arranged in the housing, a driving cavity being provided on a side of the isolation board, and a power generation cavity being provided on the other side of the isolation board;

a one-way oil channel, the one-way oil channel being located at a top of the driving cavity and the power generation cavity, and the one-way oil channel being configured to guide oil from the driving cavity to the power generation cavity in a unidirectional manner;

an oil drain mechanism, the oil drain mechanism being arranged at a bottom of the power generation cavity, and the oil drain mechanism being configured to drain oil in the power generation cavity to the driving cavity when the oil in the power generation cavity exceeds a preset amount; and a power generation driving assembly, the power generation driving assembly comprising:

an engine input shaft, one end of the engine input shaft being configured to connect to an engine, and the engine input shaft being at least partially arranged in the power generation cavity;

a power generator shaft, one end of the power generator shaft being configured to connect to a power generator, and the power generator shaft being at least partially arranged in the power generation cavity; and a third transmission gear pair, the third transmission gear pair being arranged between the engine input shaft and the power generator shaft, wherein the third transmission gear pair comprises:

an engine input gear, wherein the engine input gear is arranged on the engine input shaft and located in the power generation cavity; and a power generator input gear, wherein the power generator input gear is arranged on the power generator input shaft and meshes with the engine input gear, wherein in a height direction, a central axis of the power generator input gear is higher than a central axis of the engine input gear.

* * * * *